US005481900A

United States Patent [19]

Husar

[11] Patent Number: 5,481,900

[45] Date of Patent: Jan. 9, 1996

[54] PIPETTE SYSTEM

[75] Inventor: Dieter Husar, Hamburg, Germany

[73] Assignee: Eppendorf-Netheler-Hinz GmbH, Hamburg, Germany

[21] Appl. No.: 29,817

[22] Filed: Mar. 11, 1993

[30] Foreign Application Priority Data

Mar. 25, 1992 [DE] Germany .......................... 42 09 620.0

[51] Int. Cl.$^6$ ............................... G01N 1/14; B01L 3/02; G01F 25/00

[52] U.S. Cl. ...................... 73/1 H; 73/864.14; 73/864.18

[58] Field of Search ................................ 73/1 H, 864.18, 73/864.14

[56] References Cited

U.S. PATENT DOCUMENTS

| | | | |
|---|---|---|---|
| 4,072,330 | 2/1978 | Brysch | 73/864.14 |
| 4,229,413 | 10/1980 | Marteau d'Autry | 73/864.18 X |
| 4,284,604 | 8/1981 | Tervamäki | 73/864.18 X |
| 4,399,712 | 8/1983 | Oshikubo et al. | 73/864.16 |
| 4,616,514 | 10/1986 | Magnussen, Jr. et al. | 73/864.14 |
| 4,625,572 | 12/1986 | Yamashita | 73/864.16 |
| 4,671,123 | 6/1987 | Magnussen, Jr. et al. | 73/864.14 X |
| 4,672,857 | 6/1987 | MacDermott | 73/864.18 |
| 4,790,176 | 12/1988 | Marteau d'Autry | 73/864.18 X |
| 5,012,682 | 5/1991 | Subloewski | 73/864.18 |
| 5,024,109 | 6/1991 | Romero et al. | 73/864.16 |

FOREIGN PATENT DOCUMENTS 0041318 12/1981 European Pat. Off. .

OTHER PUBLICATIONS

Labsystems, Finland Instructions For Use Finnpipette Digital, pp. 1–7 published by Sep. 1994.

Eppendorf, Germany published by Apr. 1986 Comforpette 4700, Varipette 4710 und Comfortip cristal (3 pages).

*Primary Examiner*—Thomas P. Noland

*Attorney, Agent, or Firm*—Anderson Kill Olick & Oshinsky

[57] ABSTRACT

The present invention relates to a method for defining an error compensation for the difference between a desired quantity of liquid and the quantity of liquid actually drawn into a disposable pipette tip mounted on a plunger-operated pipette, comprising adjusting arrangement (5,6,36,50) for adjusting the stroke of a plunger (9,10) and an indicator 51 for the desired quantity of liquid, wherein the relation of the stroke of the plunger with respect to the quantity of liquid indicated is defined by a plunger-correcting factor, the pipette tip comprising an opening communicating with an operating portion to be filled with a desired quantity of liquid, and a mounting opening for disposably connecting to the plunger-operated pipette, wherein a dead volume is defined between the plunger and the opening communicating with operating portion, and to a pipette system comprising a plunger-operated pipette and a pipette tip. According to the invention, the quantity of liquid to be taken in shall be defined more accurately over the total operating range of the plunger movement. For this, a number of parameters such as the plunger correcting factor, the longitudinal internal contour of the pipette tip and the dead volume are mutually tuned for each particular quantity of liquid to be taken in resulting in a predetermined error of the quantity of liquid indicated.

1 Claim, 4 Drawing Sheets

Fig. 1
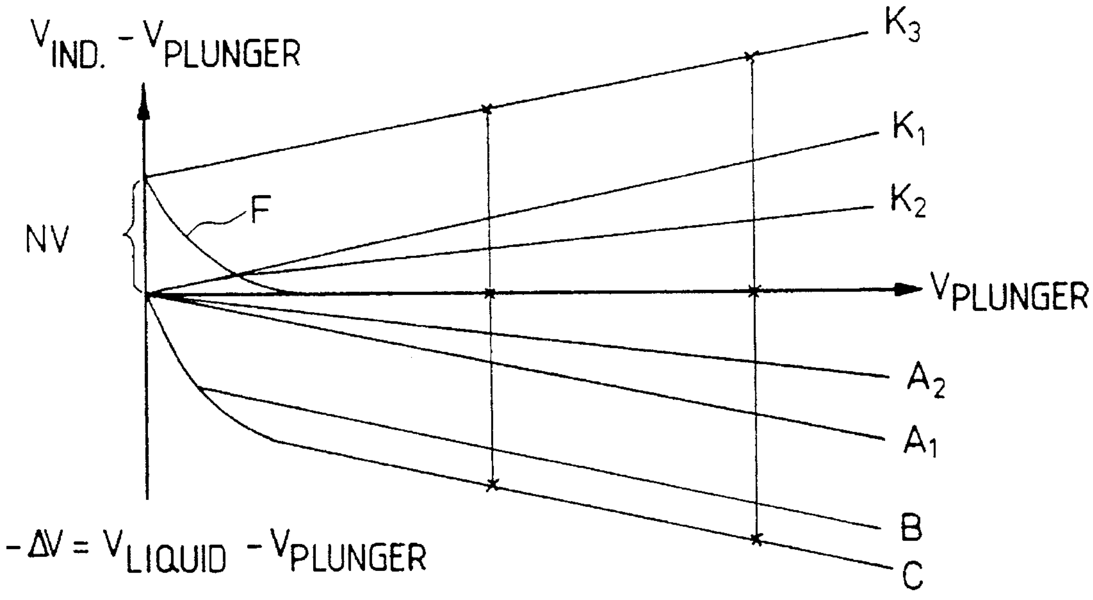
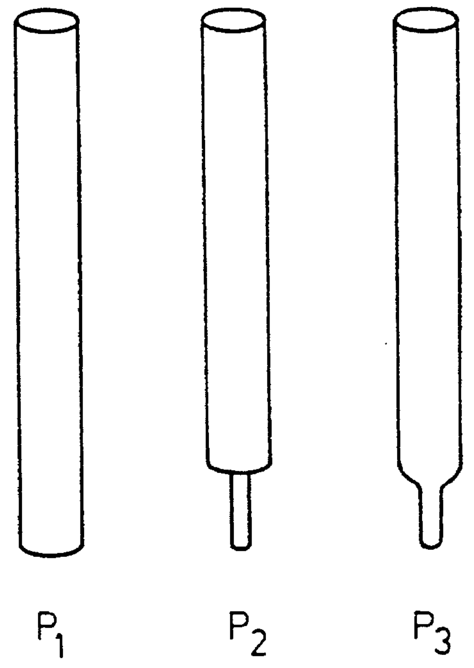
Fig. 2

PIPETTE SYSTEM

BACKGROUND OF THE INVENTION

1. Field of the Invention

The present invention relates to a method for defining an error compensation for the difference between a desired quantity of liquid and the quantity of liquid actually drawn into a disposable pipette tip mounted on a plunger-operated pipette, including means for adjusting the stroke of a plunger and means for indicating the desired quantity of liquid, wherein the relation of the stroke of the plunger with respect to the quantity of liquid indicated is defined by a plunger-correcting factor, with the pipette tip comprising an opening communicating with an operating portion to be filled with the desired quantity of liquid, and a mounting opening for releasably connecting to the plunger-operated pipette, and with a dead volume being defined between the plunger and the opening communicating with the operating portion.

2. Description of the Prior Art

German Patent 25 26 296 discloses a pipette system of the type referred to in which the piston-operated pipette includes a tapered portion for mounting a disposable tip. The inner space of the tip between the tip opening and the mounting opening comprises a first portion which is strongly tapered and an adjacent second portion which is slightly tapered. When such a tip is inserted in a deep and particularly slim container, there is the drawback that the pipette on which the tip is mounted may contact the inner wall of the container resulting in a contamination. Basically, this is avoided when using a tip disclosed in European 0 182 943, according to which the tip opening extends into a long cylindrical nose portion followed by a strong tapered portion and a mounting opening.

With the known tips, all internal spaces having varying cross sectional areas are used to be filled with liquid depending on the liquid volume drawn into the tip. Accordingly, liquid will be drawn into the strongly tapered or, respectively, cylindrical initial portion when a small piston stroke is executed, while liquid will be drawn further into the slightly tapered portion or any other adjacent portion which may be tapered or cylindrical when the piston stroke is increased. All these pipette systems suffer from the drawback that the quantity of liquid drawn into the tip by operating an adjustable plunger-actuated pipette is substantially different from the desired quantity of liquid to which the pipette is set, and which quantity is indicated to the user on a scale or the like. In particular the error between the desired and the actual quantity of liquid may vary within the range of liquid volumes to which the plunger may be set. As the plunger stroke is set by rotating a spindle to adjust a stop, the pitch of the spindle is selected such that the error between the desired quantity of liquid and the actually taken-up quantity of liquid is tolerable across the full adjusting range. The errors resulting have to be accepted, but could be determined by taking measurements afterwards.

Besides accepting these errors of unknown magnitude occurring within the full adjusting range, there is the further drawback that exchanging one tip against another tip results in further errors as the plunger-operated pipette and the tip are selected to be in mutual relation. For example, when a tip of a first type is changed against a tip of a second type, the pitch of the spindle once selected will result in unpredictable errors.

American Patent 5 024 109 discloses a method and an apparatus for performing a correction in a piston-operated pipette. The technique involves determining the height of fluid in the tip for a desired fluid volume, determining the change in dead volume resulting from having fluid of such height in the tip and determining the piston displacement required to achieve a volume equal to the sum of the desired volume and the determined change in dead volume. The height of fluid in the tip is determined from the Volume multiplied by values which are constant for a given tip size and geometry. The change in dead volume varies as a function of the desired fluid height times a constant for a given fluid, pipette system and tip. The technique makes use of an electromechanical pipette and a control unit including a processor which is coupled thereto. Before use, constants for; tips, system and fluid have to be stored into memory of the control unit. This technique is expensive.

Accordingly, it is an object of the present invention to improve a pipette system of the type referred to. Particularly, the amount of liquid to be taken up between the minimum and the maximum plunger stroke shall be determined with lower expense and a high accuracy. Still further, it shall be possible to use a plurality of different plunger-operated pipettes and tips where the errors occurring are still acceptable.

SUMMARY OF THE INVENTION

The present invention is based on the phenomenon that there is a plurality of parameters which substantially govern the error values occurring over the range of liquid volume adjustment. In particular, there is a so-called plunger correcting factor which Lakes into account the error in the mechanical system of setting the stroke of the plunger and this error is defined by the difference between the set quantity of liquid indicated and the actually executed plunger stroke. Further parameters are constituted by the internal longitudinal contour of the tip, the dead volume defined by the volume between the plunger and the liquid level in the tip, and possibly a so-called zero off-set which is inherent to particular types of tips. The present invention aims to mutually selecting the said parameters in a way to provide a predetermined error between the liquid volume indicated and the liquid volume actually received over the full adjustment range of the plunger, which error may be zero. This is in contrast to prior art pipettes merely selecting a particular pitch of the adjusting spindle in a particular pipette system, as the invention aims at rather calibrating and tuning all the parameters above referred to in order to obtain predictable errors. In other words, according to the invention, the accurate quantity of liquid taken up is known for each quantity of liquid indicated. From this follows that a desired plunger stroke may be set by using the indicating scale such that the quantity of liquid taken up corresponds to the desired quantity of liquid. According to the present invention, pipette tips may be calibrated to obtain predetermined errors. Accordingly, an extended tip may be mounted on a pipette to avoid wall contact and contamination. Vice versa, it is possible to obtain predetermined errors by calibrating a plunger-operated pipette to be used for available tips.

The error may be defined in different ways. For a practical handling of the system, it is particularly useful to determine a constant absolute or relative error as this makes it possible to particularly simply determine the difference between the desired quantity of liquid and the actually taken up quantity of liquid.

Usually the liquid level raises up to an operating portion of the pipette tip. In compensating variations of the inner contour including discontinuities in the lower end of the tip, a proper calibration may require a zero off-set of the volume indicated with respect to the stroke of the plunger.

In actual use, some parameters such as the plunger-correcting factor, the dead volume and possibly a zero off-set value are predetermined, in particular when a pipette tip has to be fit to an available plunger pipette. To obtain a defined error, it may be suitable to properly select the internal longitudinal contour of the tip with respect to the parameters above referred to.

When the operating range of the tip is selected to be substantially cylindrical, a constant absolute error over the full adjusting range of liquid volumes may be realized. For tips having a narrow tip opening and a sufficiently large space portion for receiving the quantities of liquid adjusted, the latter can include a gradually increasing transition zone. This zone preferably has a transition radius or cone which angle is selected to be as small as possible to avoid undesired turbulence effects. The transition zone opens into an operating portion. Particularly for inserting the tip into relatively deep and slim containers of liquid, the tip comprises a slim suction tube extending from the tip opening. Preferably a tip has then a transition zone opening into an operational portion.

By adjusting the plunger-correcting factor the pipette system may be adjusted to varying liquid densities or barometric pressures. This is simply possible by selecting a proper spindle for adjusting the stroke of the plunger.

It is further contemplated to make the dead volume adjustable. Particularly this is possible by using different tips, wherein a tip to be used for lighter liquids must be designed to be longer, but having the same diameter. To vary the dead volume, adapters may be inserted between the plunger-operated pipette and the tip.

According to the invention, selecting the parameters to obtain a predetermined error may be performed by trial. Initially an error for the quantity of liquid indicated may be set for each quantity of volume taken up. To obtain the particular errors, the plunger-correcting factor, the internal contour of the tip and the dead volume have to be selected in a mutual relation. As the plunger-correcting factor and the dead volume are usually not changed any more after they have once been selected, the values of these parameters are initially determined at least preliminarily, wherein values of known pipette systems can be taken into account. What remains then is to select the inner contour of the tip as the last parameter to obtain the errors intended. This method yields proper values by conducting suitable trials. However, by following up this method, one could arrive at an inner contour of the tip which forces to select different parameters or to even predetermine different error values.

With a view to the expenditure of this empirical method, a mathematical method is preferred to calculate the calibration. The following equation defines the error V for the difference between the volume of liquid received in the tip and the volume of liquid resulting from displacing the plunger.

$$V_{piston}=V_{liquid}+\Delta V \tag{A}$$

The error results from the liquid volume hanging on the air pad between the liquid level and the plunger which liquid volume draws the air pad downwardly resulting in enlarging the air pad correspondingly.

Variations of the volume and pressure in the air pad are calculated as follows:

$$p\cdot V=const.$$

or:

$$P_o\cdot V_t=(P_o-\Delta p)\cdot(V_t+\Delta V) \tag{B}$$

wherein:

$V_t$=dead volume of pipette and tip (air pad volume)

$P_o$=barometric pressure $\Delta_p$=pressure variation corresponding to hydrostatic pressure of the liquid column in the tip from (B) follows:

$$\frac{p_o}{p_o-\Delta p}\,V_t=V_t+\Delta V-$$

$$\Delta V=\left[1-\frac{p_o}{p_o-\Delta p}\right]V_t-$$

$$\Delta V=\frac{-\Delta p-}{p_o-\Delta p}\,V_t$$

$$\Delta p \ll p_o$$

the error volume Delta V is defined by:

$$\Delta V=\frac{\Delta p}{p_o}\,V_t \tag{C}$$

Dead volume and barometrical pressure are said to be known. The pressure variation Δp corresponds to the hydrostatic pressure of the liquid column having the height h:

$$p=j\cdot g\cdot h \tag{D}$$

wherein $j$=specific weight $g$=acceleration due to gravity

The height h of the liquid column is determined by the quantity of liquid taken up and the internal contour of the tip:

$$V_{liquid}=\int_0^h Q(y)dy \tag{E}$$

wherein $Q(y)$=cross section in the distance y above the tip opening

Combining (A), (C) and (D) results in:

$$V_{piston}=V_{liquid}+\frac{f\times g\times h}{p_o}\,V_t \tag{F}$$

By using the equations (E) and (F) the stroke of the piston ($V_{piston}$) in response to the quantity of liquid ($V_{liquid}$) may be calculated.

The stroke of the pipette plunger is limited by stops, of which one stop is adjusted by a spindle which is coupled to an indicator. This is defined by the following equation:

$$V_{piston}=a\cdot V_{indicator}+b \tag{G}$$

wherein $a$=plunger correcting factor $b$=zero off-set

The pitch S of the spindle (millimeter/rotation) is defined by:

$$S = a \times \frac{\text{calibration of metering system}}{\text{plunger cross section}}$$

From (F) and (G) follows:

$$V_{ind.} = \left( V_{liquid} + \frac{f \times g \times h}{p_o} V_t - b \right) \frac{1}{a} \quad \text{(H)}$$

From this follows the absolute error $E_{abs.} = V_{liquid} - V_{ind.}$ The relative error is calculated as follows:

$$E_{rel.} = E_{abs.} / V_{liquid} \quad \text{(J)}$$

$$\text{wherein: } E_{rel.} = \frac{V_{liquid} - V_{ind.}}{V_{liquid}}$$

By using the equations (I), (J) and (E) the plunger-correcting factor a, the zero off-set b, the inner contour Q (Y) and the dead volume $V_t$ may be mutually selected such that a predetermined error, either absolute or relative is associated to each liquid volume sucked in. It is useful to set the error, to preliminary select the plunger correcting factor, the zero off-set and the dead volume and subsequently to calculate the internal contour of the tip.

On the other hand it is possbile to set a special internal contour which is defined for a cylindrical tip by equation (E):

$$V_{liquid} = Q \cdot h \quad \text{(K)}$$

wherein $$Q = \text{const.}$$

From (I) and (K) follows:

$$E_{abs} = V_{liquid} - \frac{1}{a} \left( V_{liquid} + \frac{fg \times V_{liquid}}{p_o} \; \frac{V_t}{Q} - b \right)$$

The following equation is valid when the absolute error for all quantities of liquid is constant:

$$O = 1 - \frac{1}{a} - \frac{f \times g}{p_o} \times \frac{V_t}{Q \times a} \quad \text{(L)}$$

and $$E_{abs.} = \frac{b}{a}$$

In using the equation (L) all parameters may be calculated provided that two values of the three parameters dead volume, plunger correcting factor and zero off-set are properly selected.

BRIEF DESCRIPTION OF THE DRAWINGS

The invention, together with additional objects, features and advantages thereof will be best understood from the following description and the accompanying drawings, in which:

FIG. 1 Is a diagram showing the difference of the volume indicated minus the volume of the piston displacement (vertical) in response to the volume of the plunger displacement (horizontal);

FIG. 2 Pipette tips $P_1$, $P_2$ and $P_3$ corresponding to curves A, B and C in. FIG. 1.

DETAILED DESCRIPTION OF THE PREFERRED EMBODIMENTS

Figure 4:
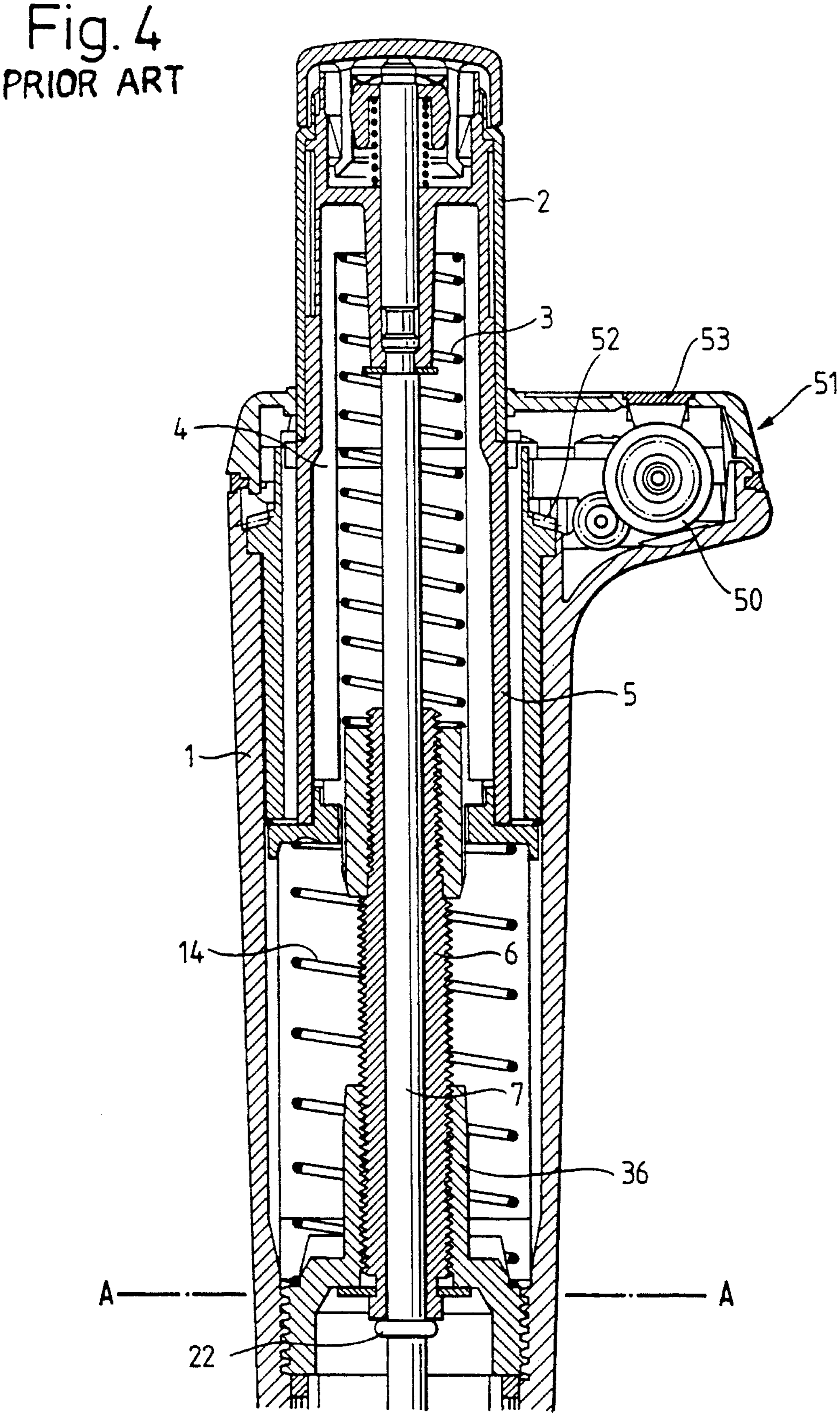
Fig. 4 PRIOR ART
FIG. 4 An upper section of a plunger-operated piston.
Figure 5:
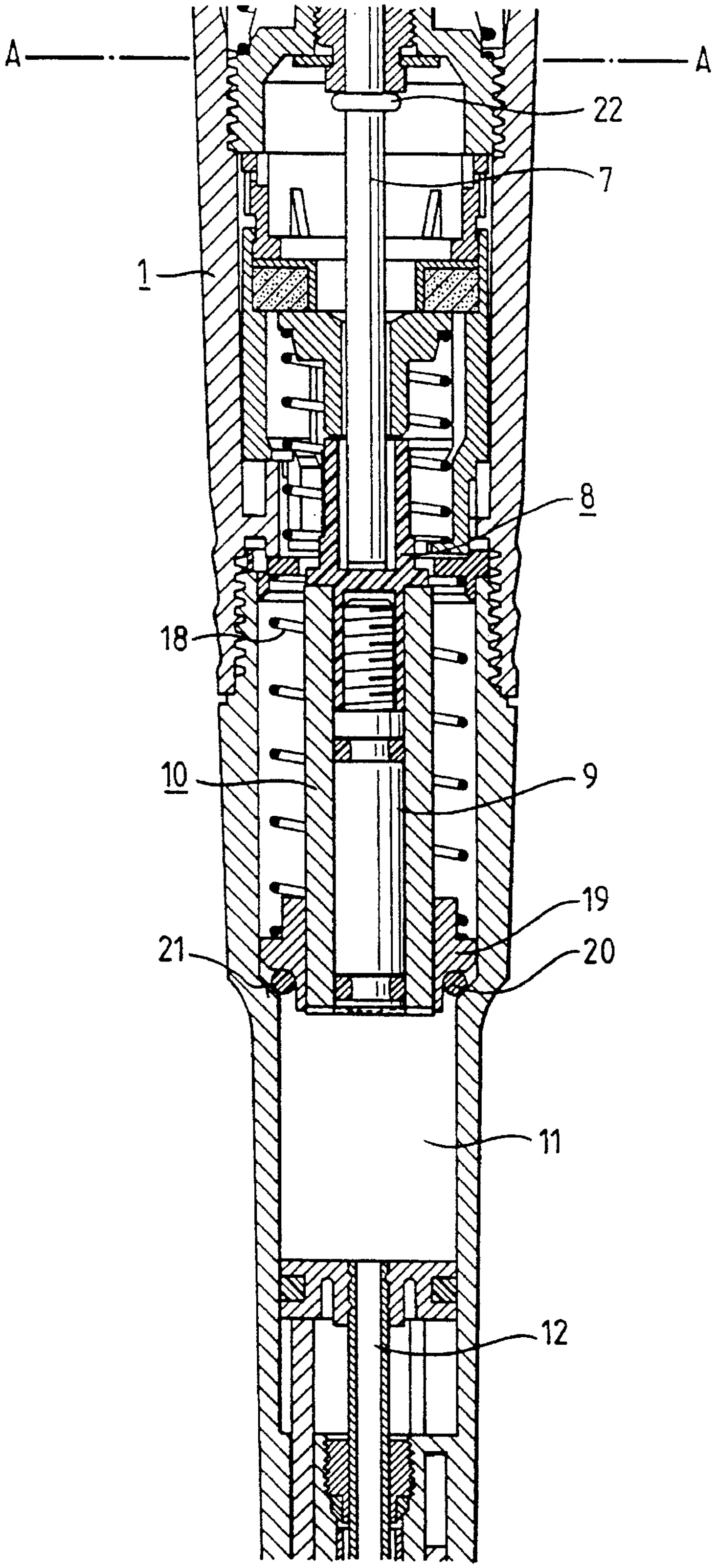
Fig. 5 PRIOR ART
FIG. 5 A lower section of a plunger-operated pipette which is placed to the upper section at A—A.

The pipette shown in FIG. 4 and 5 is disclosed in U.S. Ser. No. 07/694 234 filed May 1, 1991 assigned to Applicants of the present application and now abandoned. This application is incorporated herewith by reference. Generally the pipette shown has a housing 1. At the upper end of the housing, there is an actuating button 2 which is movable against a spring 3. The button 2 is fixed to a plunger rod 7 extending through a spindle 6. As shown in FIG. 5 the lower end of the rod 7 carries a connecting piece 8 including a support 9 for a piston 10. A spring 18 urges a lower sleeve 19 for guiding the plunger 9, 10 to an internal conical face 21 of the housing 1. The sleeve 19 contacts the housing through a resilient sealing ring 20.

Figure 3:
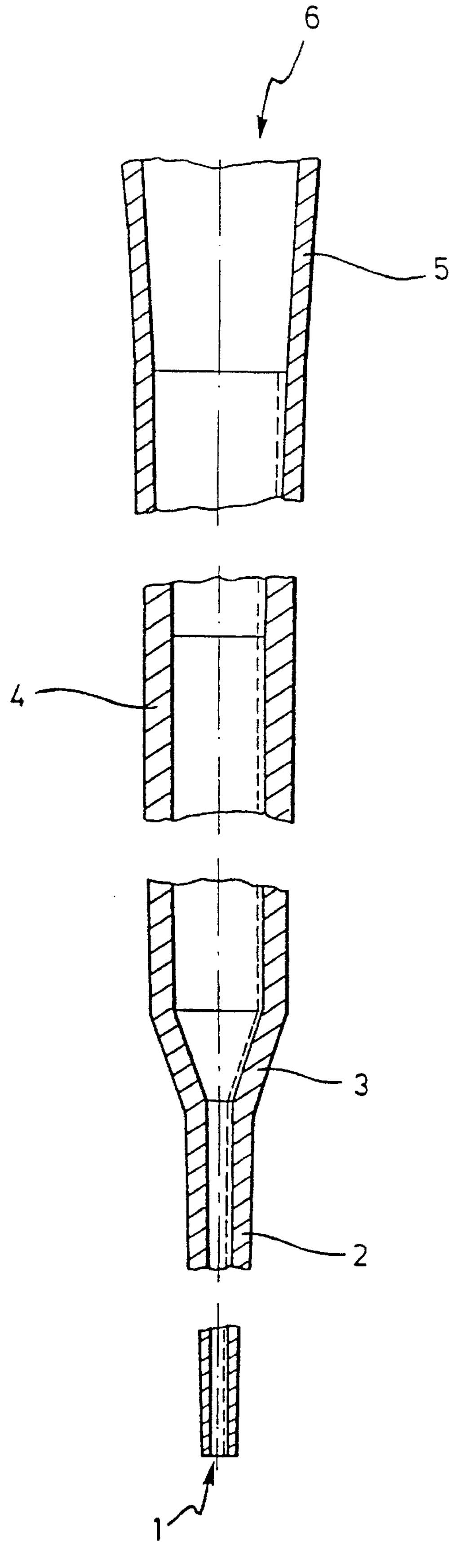
FIG. 3 A sectional view of a pipette tip in a greatly enlarged scale and interrupted four times.

When pressing the button 2 vertically downwardly, the plunger 9, 10 is displaced into the cylinder chamber 11 expelling air from the cylinder chamber 11 through the tube 12. At the lower end of the tube 12 a disposable pipette tip as shown in FIG. 3 is mounted on a wedge of the tube 12 in a manner not shown. The cylinder chamber 11 and the portion of the tube 12 and the pipette tip not filled with liquid define the dead volume of the pipette.

When the button 2 is pressed vertically downwardly, the plunger 9, 10 is displaced until it rests on the upper end of the tube 12 held by a stationary piece in the cylinder chamber. This constitutes a lower stop for the stroke of the plunger.

The piston rod 7 is provided with a flange 22 on which the spindle 6 rests in the home position of the rod 7 and the plunger 9, 10. This flange 22 thus defines the upper stop for the plunger 9, 10. The upper stop is adjustable as follows: The button 2 is fixed to a depending sleeve 5 rotatably supported in the casing. The spindle 6 surrounding the rod 7 is fixed to the rotatable sleeve 5. The outer thread of the spindle 6 cooperates which an internal thread of a member 36 fixed to the housing 1. Accordingly, when the button 2 is manually rotated, the spindle 6 is screwed into and out of the threaded member 36. In other words, the spindle 6 is axially adjusted thus defining the stop of the flange 22 of the rod 7 when the plunger 9, 10 returns to its home position which is defined by the flange 22 resting upon the spindle 6 after releasing the button 2. Accordingly the stroke of the plunger is defined by the upper stop of the rod in its home position.

When the button 2 is rotated, the sleeve 5 which is provided with gear teeth 52 drives a wheel 50 through suitable gear means. The rotation of the wheel 50 is shown by a scale visible through a window 53. The scale is calibrated to adjust the upper stop to draw a desired quantity of liquid into the pipette tip disposably mounted on the tube 12.

As mentioned before, FIGS. 4 and 5 show a part of the dead volume 11 and 12 as well as the adjusting and indicating means 51 for setting and indicating the desired quantity of liquid.

The curves $A_1$ and $A_2$ shown in FIG. 1 illustrate the error of a cylindrical tip $P_1$ shown in FIG. 2. For a cylindrical tip the negative error in volume—V linearly increases when the stroke of the plunger increases. Curve $A_1$ represents the error for a tip having a smaller cross section and the curve $A_2$ represents a tip having a larger cross section.

The error—V of the tip is compensated by calibrating the plunger-operated pipette. By adjusting the plunger correcting factor, the difference between the liquid volume indicated and the plunger stroke is selected such that the liquid volume indicated corresponds to the liquid volume taken up. In FIG. 1 the curve $K_1$ shows the compensation of a plunger-operated pipette having a larger plunger correcting factor as represented by curve $A_1$, and $K_2$ shows the compensation of a pipette having a smaller plunger correcting factor, as represented by curve $A_2$. The diagram shows that for each stroke of the plunger the difference between the liquid volume indicated and the liquid volume taken up is zero.

Curve B in FIG. 1 shows the error of the tip $P_2$ shown in FIG. 2. Tip $P_2$ has a slim suction tube defining the tip opening in which the liquid level rapidly rises when the plunger is initially displaced. Accordingly, the negative error—V is relatively high in this initial portion of the tip. When the liquid level reaches the adjacent cylindrical portion of enlarged diameter, the further increase of the negative error in volume is much lower as curve B shows in FIG. 1.

The error C shown in FIG. 1 corresponds to the tip $P_3$ of FIG. 2. Here, there is a tapered transition between a slim suction tube and a cylindrical tip portion of enlarged diameter. Accordingly the error gradually merges from a steep increase due to the slim suction portion to a relatively slow increase corresponding to the filling volume in the cylindrical portion.

The curve $K_3$ in FIG. 1 is shown to compensate the errors exemplified by curves B and C. Curve $K_3$ has a zero off-set NV, i.e. a certain quantity of liquid is indicated when the plunger is still in its home position. The value of the zero off-set is selected such that the error in volume is compensated when the stroke of the plunger raises the liquid level into the operating portion of the tip. The system thus comprises an error F decreasing from a maximum initial value to zero which is obtained when the liquid level rises to the operating portion.

FIG. 3 shows a tip according to the invention, comprising a suction opening 1 provided in a slim suction tube 2. The suction tube 2 opens into a transition cone 3 which is in communication with an enlarged operating portion 4 which opens into a mounting cone 5 including a mounting opening 6 for connecting the disposable tip to the tube 12 shown in FIG. 5.

The stroke of the plunger is selected such that the quantity of liquid drawn into the tip is accomodated within the operating portion 4. To obtain a substantially constant error the operating portion 4 of the tip is preferably cylindrical.

To facilitate the injection moulding of the tip, there is a slight tapered configuration of the suction tube 2 and the operating portion 4 which, however, does not adversally affect the error. The transition cone is shaped to have an angle which is approximately 7° to avoid turbulences.

Typically a tip according to the invention has an overall length of about 100 mm including 25 mm for the suction tube 2. The diameter increases from about 0.5 mm for the opening 1 to about 3 mm in the operating portion 4.

I claim:

1. A method of defining a compensation error resulting from a difference between a desired quantity of liquid to be drawn into a disposable pipette tip, which is mounted on a plunger-operated pipette, and a quantity of liquid actually drawn into the pipette tip, said method comprising the steps of:

providing a disposable pipette tip having a predetermined longitudinal inner contour;

providing a plunger-operated pipette on which the disposable pipette tip is mounted, which has a displaceable plunger and means for adjusting a displacement stroke of the plunger, and which is characterized by a predetermined plunger-correcting factor, defined by the relationship between the displacement stroke of the plunger and an amount of liquid to be drawn into the pipette tip, and a pre-determined dead volume defined by a space between an end surface of the plunger and an opening of the pipette tip communicating with an operating portion of the pipette;

determining the compensation error for different amounts of fluid to be drawn into the pipette tip and corresponding to the predetermined longitudinal inner contour of the pipette tip, the predetermined plunger-correcting factor and the predetermined dead volume of the plunger-operated pipette, for a total operating range of the pipette tip; and adjusting the predetermined plunger-correcting factor and the predetermined dead volume so that the determined compensation error is substantially zero for the total operating range of the disposable adjustable tip.

* * * * *